(12) United States Patent
Harres

(10) Patent No.: US 7,215,893 B2
(45) Date of Patent: May 8, 2007

(54) RF PHOTONICS RESIDUAL ERROR CORRECTION

(75) Inventor: Daniel N. Harres, Belleville, IL (US)

(73) Assignee: The Boeing Company, Chicago, IL (US)

( * ) Notice: Subject to any disclaimer, the term of this patent is extended or adjusted under 35 U.S.C. 154(b) by 692 days.

(21) Appl. No.: 10/651,279

(22) Filed: Aug. 28, 2003

(65) Prior Publication Data

US 2005/0047796 A1 Mar. 3, 2005

(51) Int. Cl.
*H04B 10/04* (2006.01)
*H04B 10/12* (2006.01)

(52) U.S. Cl. ............... 398/183; 398/182; 398/193; 398/194

(58) Field of Classification Search ........ 398/194–195, 398/185, 48, 186, 193
See application file for complete search history.

(56) References Cited

U.S. PATENT DOCUMENTS

| 3,579,145 | A | * | 5/1971 | De Lange | 359/276 |
| 3,956,626 | A | * | 5/1976 | Ross | 398/184 |
| 5,161,044 | A | * | 11/1992 | Nazarathy et al. | 398/194 |
| 5,416,628 | A | * | 5/1995 | Betti et al. | 398/185 |
| 5,515,196 | A | * | 5/1996 | Kitajima et al. | 398/185 |
| 5,515,199 | A | * | 5/1996 | Farina | 359/326 |
| 5,699,179 | A | * | 12/1997 | Gopalakrishnan | 398/194 |
| 2003/0175037 | A1 | * | 9/2003 | Kimmitt et al. | 398/198 |
| 2003/0210915 | A1 | * | 11/2003 | Miyata et al. | 398/198 |

* cited by examiner

*Primary Examiner*—Kenneth Vanderpuye
*Assistant Examiner*—Luis Garcia
(74) *Attorney, Agent, or Firm*—Harness, Dickey & Pierce, P.L.C.

(57) ABSTRACT

A fiber optic communication system is provided that includes a light source adapted to emit a system optical signal and an electrical signal source adapted to provide a data input electrical signal. Additionally, the fiber optic communication system includes a feed forward photonic modulation circuit adapted to receive the data input electrical signal and the system optical signal and output a final modulated optical signal substantially free from residual error.

33 Claims, 2 Drawing Sheets

RF PHOTONICS RESIDUAL ERROR CORRECTION

FIELD OF INVENTION

The invention relates generally to signal transmissions within a mobile platform communication system. More specifically, the invention relates to maintaining signal integrity of optical signals over a wide frequency range and a wide amplitude range within a mobile platform fiber optic communications system.

BACKGROUND OF THE INVENTION

At least some links within communication systems of a mobile platform, such as an aircraft, bus, ship or train, transmit signals at very high frequencies, e.g. greater than 1 GHz. Signals at such high frequencies can not be digitally sampled and therefore must be transmitted as an analog signal. Additionally, these high frequency signals often require a very high degree of transmission accuracy between various points of the mobile platform. For example, electronic warfare systems of an aircraft require a high degree of transmission accuracy. Currently, coaxial cable is typically used to provide such communication links. However, coaxial cable is costly and very heavy and thus adds production costs and weight to the mobile platform. To reduce this cost and weight, attempts have been made to incorporate fiber optic links in some known mobile platform communications systems. To date, implementation of fiber optics has been impeded by the inability to maintain linearity, i.e. transmission accuracy, between the high frequency electrical signal input to the communication system and the optical signal output from the communication system. That is, fiber optic communication systems within the mobile platform are generally not capable of converting such high frequency electrical signals to optical signals without degradation of the signal.

More specifically, in order to modulate a laser source at high frequencies, an external modulator is generally employed, for example a Mach-Zehnder interferometer. When using a modulation device, such as a Mach-Zehnder interferometer, the optical signal is modulated across one arm of the interferometer, thereby delaying the phase of the optical signal through that arm with respect to the other arm of the interferometer. As a result of the constructive or destructive interference, the optical signal output from the interferometer is amplitude modulated. However, the modulation of optical signals at high frequencies within a broad range of amplitudes is generally non-linear, i.e. the optical signals are generally distorted with respect to the electrical signal used to modulate the optical signal.

Therefore, it would be desirable to employ a fiber optic communication system within a mobile platform, wherein optical signals can be modulated within a wide range of frequencies and amplitudes without distortion. Thus, there would be very little degradation or distortion of the optical signals with respect to the electrical signal use to modulate the optical signal. Employing such fiber optics in certain mobile platform communication systems would save costs and considerably reduce the payload of the mobile platform.

BRIEF SUMMARY OF THE INVENTION

In one preferred embodiment of the present invention, a fiber optic communication system is provided that converts a data input electrical signal to a final modulated optical signal with a high degree of accuracy. More specifically, the system includes a feed forward photonic modulation (FFPM) circuit that converts the data input electrical signal to the final modulated optical signal. The FFPM utilizes a feed forward technique to correct for degradation and/or distortion in the final modulated optical signal. Thus, the FFPM converts the data input electrical signal such that the final modulated optical signal has a high degree of linearity with respect to the data input electrical signal.

The FFPM circuit includes a first portion that receives the data input electrical signal and a system optical signal. The FFPM first portion utilizes the input electrical signal and the system optical signal to generate a first modulated optical signal having a first wavelength. The FFPM first portion then splits the first modulated optical signal into a first segment and a second segment, each having the first wavelength. The FFPM circuit additionally includes a second portion that receives the data input electrical signal, the system optical signal and the second segment of the first modulated optical signal. The FFPM second portion utilizes the data input electrical signal, the system optical signal and the second segment to generate a second modulated optical signal having a second wavelength. The FFPM second portion then combines the second segment with the second modulated optical signal to generate a summed optical signal.

The FFPM circuit further includes a third portion that receives the summed optical signal and the system optical signal. The FFPM third portion utilizes the summed optical signal and the system optical signal to generate a corrective modulated optical signal having a third wavelength. Further yet, the FFPM circuit includes a fourth portion that combines the first segment of the first modulated optical signal with the corrective modulated optical signal to generate the final modulated optical signal.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

Figure 1:
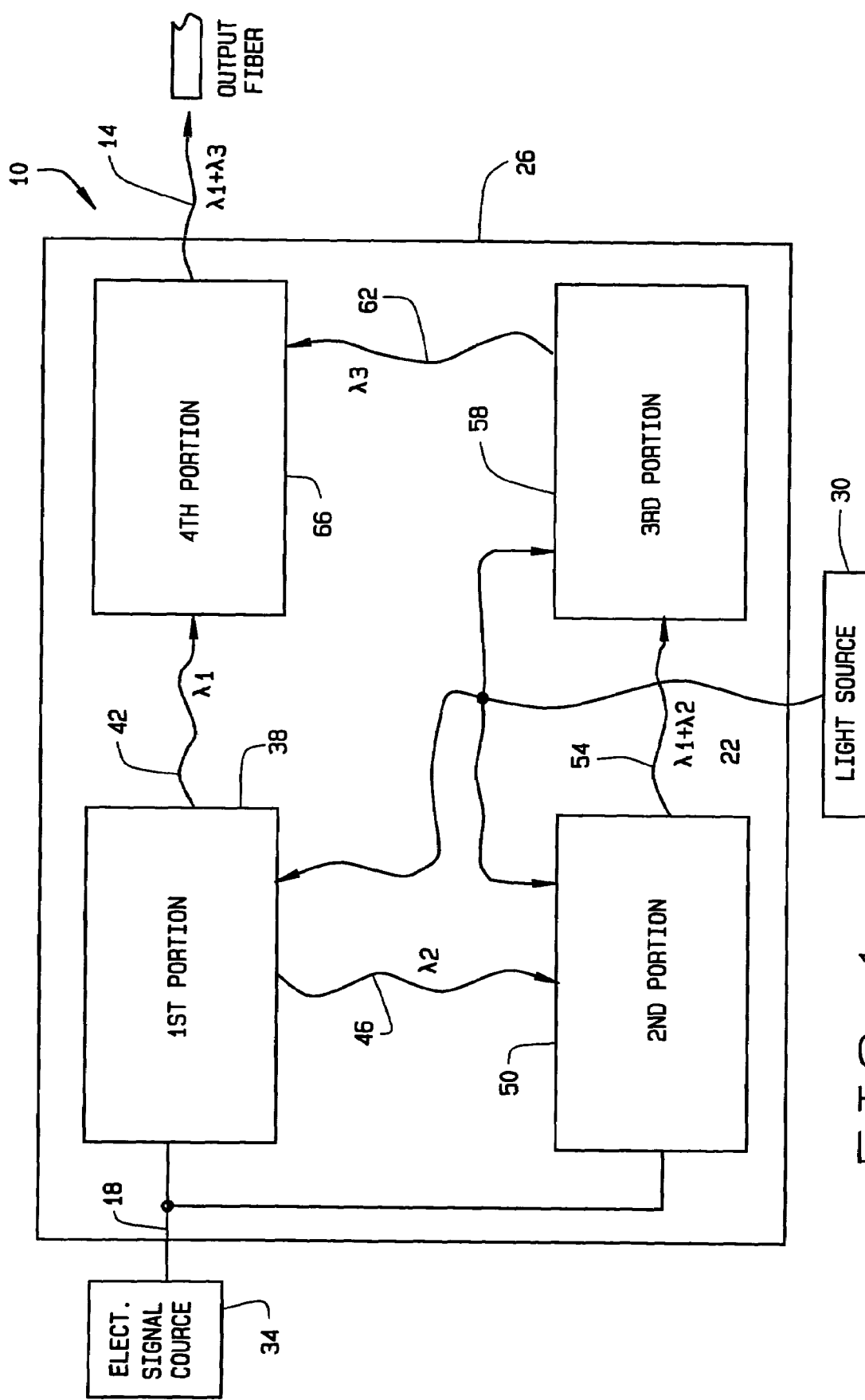
FIG. 1 is a block diagram of a fiber optic communication system, in accordance with one preferred embodiment of the present invention.

FIG. 1 is a block diagram of a fiber optic communication system 10, in accordance with one preferred embodiment of the present invention. The system 10 generates a final modulated optical signal 14 having a high degree of linearity with respect to a data input electrical signal 18 used to modulate a system optical signal 22. More specifically, the system 10 includes a feed forward photonic modulation (FFPM) circuit 26. The FFPM circuit 26 is especially well suited for converting high frequency analog data input electrical signals 18, e.g. radio frequency signals, within a very broad range of amplitudes to the final modulated optical signals 14. The final modulated optical signals 14 generated by the FFPM circuit 26 have a high degree of linearity with respect to the high frequency data input electrical signals 18. That is, the final modulated optical signals 14 have little or substantially no degradation with respect to the high frequency data input electrical signals 18. Thus, the system 10 is suitable for use in any environment where it is desirable to utilize optical signals to communicate data from one point to another, for example within a mobile platform, such as an aircraft, bus, boat or train.

The system 10 additionally includes a light source 30, such as a laser, for emitting the system optical signal 22, and an electrical signal source 34 that provides the data input electrical signal 18 to the FFPM circuit 26. In one preferred embodiment, the data input electrical signal 18 is a high frequency analog electrical signal. The light source 30 emits the system optical signal 22 at a substantially constant amplitude. The electrical signal source 34 can be any device that communicates information or data via electrical signals. For example, the electrical signal source 34 can be a component of an electronic warfare system onboard a military aircraft. In which case the electrical signal source 34 may generate one or more data input electrical signals 18 to communicate data to a pilot regarding the vulnerability of the aircraft to hostile weapons, e.g. missiles and aerial rockets.

The FFPM circuit 26 includes a first portion 38 that receives the data input electrical signal 18 and the system optical signal 22. The FFPM first portion 38 utilizes the input electrical signal 18 and the system optical signal 22 to generate a first modulated optical signal 40 (shown in FIG. 2) having a first wavelength $\lambda_1$. The FFPM first portion 38 splits the first modulated optical signal 40 into a first segment 42 and a second segment 46, each having the first wavelength $\lambda_1$. The FFPM circuit 26 additionally includes a second portion 50 that receives the data input electrical signal 18, the system optical signal 22 and the second segment 46 of the first modulated optical signal 40. The FFPM second portion 50 utilizes the data input electrical signal 18, the system optical signal 22 and the second segment 46 to generate a second modulated optical signal 52 (shown in FIG. 2) having a second wavelength $\lambda_2$. The FFPM second portion 50 then combines the second segment 46 of the first modulated optical signal 40 with the second modulated optical signal 52 to generate a summed optical signal 54.

The FFPM circuit 26 further includes a third portion 58 that receives the summed optical signal 54 and the system optical signal 22. The FFPM third portion 58 utilizes the summed optical signal 54 and the system optical signal 22 to generate a corrective modulated optical signal 62 having a third wavelength $\lambda_3$. Further yet, the FFPM circuit 26 includes a fourth portion 66 that combines the first segment 42 of the first modulated optical signal 40 with the corrective modulated optical signal 62, thereby generating the final modulated optical signal 14. The final modulated optical signal 14 has a high degree of linearity, i.e. little or substantially no degradation, with respect to the data input electrical signal 18.

Figure 2:
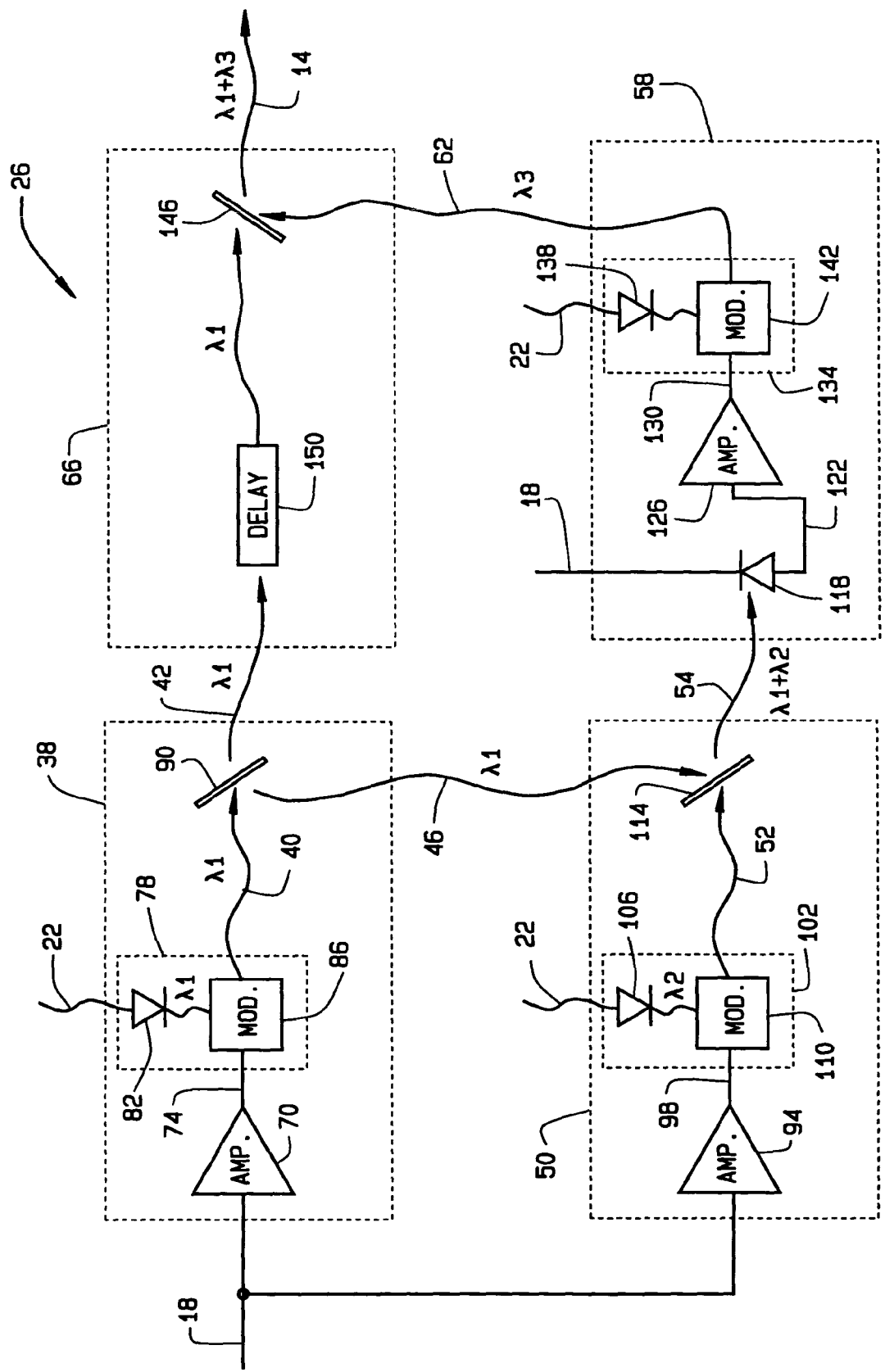
FIG. 2 is a schematic of one preferred embodiment of feed forward photonic modulation (FFPM) circuit shown in FIG. 1.

FIG. 2 is a schematic of one preferred embodiment of the feed forward photonic modulation (FFPM) circuit 26, shown in FIG. 1. The first portion 38 of the FFPM circuit 26 includes a first electrical amplifier that amplifies the data input electrical signal 18 to a first level and outputs a first amplified electrical signal 74. The first portion 38 additionally includes a first optical modulating sub-circuit 78. The first optical modulating sub-circuit 78 uses the first amplified electrical signal 74 to modulate the system optical signal 22 and output the first modulated optical signal 40 having the wavelength $\lambda_1$. The first optical modulating sub-circuit 74 includes a first laser diode 82 that has the first wavelength $\lambda_1$. The system optical signal 22 is adjusted to have the first wavelength of $\lambda_1$ as it passes through the first laser diode 82.

The system optical signal 22 having the first wavelength $\lambda_1$ is then input to a first optical modulator 86, e.g. a Mach-Zehnder interferometer. The first optical modulator 86 modulates the system optical signal 22 in accordance with the first amplified electrical signal 74 and outputs the first modulated optical signal 40 having the first wavelength $\lambda_1$. The first portion 38 further includes a splitter 90 that splits the first modulated optical signal 40 into the first segment 42 and the second segment 46, wherein each of the first and second segments 42 and 46 comprise a portion of the first optical signal 40. The ratio of first segment 42 to the second segment 46 can be any desirable ratio depending on the application of the fiber optic communications system 10. For example, the first segment 42 could comprise 90% of the first optical signal 40 and the second segment could comprise 10% of the first optical signal 40. The first and second segments 42 and 46 each have the first wavelength $\lambda_1$.

In one preferred embodiment, the first electrical amplifier 70 is capable of handling analog electrical signals over a very wide range of frequencies and amplitudes. Likewise, the first laser diode 82, the first optical modulator 86, and the splitter 90 are capable of handling analog optical signals over a very wide range of frequencies and amplitudes. For example, the frequency ranges may include electrical and/or optical signals with frequencies greater that 1 GHz.

The second portion 50 of the FFPM circuit 26 includes a second electrical amplifier 94 that amplifies the data input electrical signal 18 to a second level and outputs a second amplified electrical signal 98. The second portion 50 additionally includes a second optical modulating sub-circuit 102. The second optical modulating sub-circuit 102 uses the second amplified electrical signal 98 to modulate the system optical signal 22 and output the second modulated optical signal 52 having the wavelength $\lambda_2$. The second optical modulating sub-circuit 102 includes a second laser diode 106 that has the second wavelength $\lambda_2$. The system optical signal 22 is adjusted to have the second wavelength of $\lambda_2$ as it passes through the second laser diode 106.

The system optical signal 22 having the second wavelength $\lambda_2$ is then input to a second optical modulator 110, e.g. a Mach-Zehnder interferometer. The second optical modulator 110 modulates the system optical signal 22 in accordance with the second amplified electrical signal 98 and outputs the second modulated optical signal 52 having the second wavelength $\lambda_2$. The second portion 50 further includes a first dichroic mirror 114 that combines the second segment 46 of the first modulated optical signal 40 with the second modulated optical signal 52. The output of the first dichroic mirror 114 is the summed optical signal 54. The summed optical signal 54 comprises the second segment 46 having the first wavelength $\lambda_1$ and the second modulated optical signal having second wavelength $\lambda_2$.

In one preferred embodiment, the second electrical amplifier 94 is capable of handling analog electrical signals over a very wide range of frequencies and amplitudes. Likewise, the second laser diode 106, the second optical modulator 110 and the dichroic mirror 114 are capable of handling analog optical signals over a very wide range of frequencies and amplitudes. For example, the frequency ranges may include electrical and/or optical signals with frequencies greater that 1 GHz.

The first electrical amplifier 70 and the second electrical amplifier 94 each have a specified gain, wherein the gain of the second electrical amplifier 94 is less than the gain of the first electrical amplifier 70. For example, the first electrical amplifier 70 may have a gain of +10 while the second electrical amplifier 94 may have a gain of −1. Since the second electrical amplifier 94 has a smaller gain, the second amplified electrical signal 98 incurs less distortion. That is, the second amplified electrical signal 98 is a more accurate, i.e. more linear, signal with respect to the data input electrical signal 18. Generally, the greater the difference in the gains of the first and second electrical amplifier 70 and 94, the more accurate the second amplified electrical signal 98 will be in relation to the first amplified electrical signal 40. Additionally, as described above, the ratio of first segment 42 to the second segment 46 can be any desirable ratio depending on the application of the fiber optic communications system 10. However, in one preferred embodiment, the ratio of the first segment 42 to the second segment 46 equals the ratio of the gains of the first and second electrical amplifiers 70 and 94. For example, if the gains of the first and second electrical amplifiers 70 and 94 are respectively +10 and −1, then the splitter 90 will spit the first modulated optical signal 40 such that the first segment 42 is 90% of the first modulated optical signal 40 and the second segment 46 is 10%.

The third portion 58 of the FFPM circuit 26 includes an optical detector 118. The optical detector 118 receives the data input electrical signal 18 and converts the summed optical signal 54 into a corrective electrical signal 122. The third portion 58 also includes a third electrical amplifier 126 that amplifies the corrective electrical signal 122 and outputs a corrective amplified electrical signal 130. The third portion 58 additionally includes a third optical modulating sub-circuit 134. The third optical modulating sub-circuit 134 uses the corrective amplified electrical signal 130 to modulate the system optical signal 22 and output the corrective modulated optical signal 62 having the third wavelength $\lambda_3$. The third optical modulating sub-circuit 134 includes a third laser diode 138 that has the third wavelength $\lambda_3$. The system optical signal 22 is adjusted to have the third wavelength of $\lambda_3$ as it passes through the third laser diode 138.

The gain of the third electrical amplifier 126 is adjusted so that the overall optical gain of the FFMP third portion 58 has the ratio of the split at the splitter 90, only having a negative value. Thus, for example, the exemplary system in which the first and second segments 42 and 46 respectively contain 90% and 10% of the power of the first modulated optical signal 40, the third electrical amplifier 126 will adjust the corrective modulated optical signal 62 to have 9 times the power of the summed optical signal 54. Additionally, the corrective modulated optical signal 62 will have a negative value relative to the summed signal 54. Thus, in this exemplary system the gain of the third electrical amplifier 126 will be determined as follows. If the first modulated optical signal 40 has a distortion of 'e', the first modulated optical signal 40 will have a coefficient of 1(1−e). Accordingly, the first segment 42 of the first modulated optical signal 40 will have a coefficient of 0.9(1−e) and the second segment 46 will have a coefficient of 0.1(1−e). The second modulated optical signal 52 will have a coefficient of −0.1 because the gain of the second electrical amplifier 94 is −1/10 of the gain of the first electrical amplifier 70 and the second modulated optical signal 52 is substantially undistorted. Therefore, the summed modulated signal 54 has coefficient 0.1(1−e)−0.1=−0.1e. The third amplifier 126 has its gain adjusted so that the FFMP third portion 58 has overall gain of −9, such that the corrective modulated optical signal 62 will have a coefficient of 0.9e. When the corrective modulated optical signal 62 is summed with the first segment 42 by the second dichroic mirror 146 the final optical signal 14 with have a coefficient of 0.9, relative to the first optical signal 40. Therefore, the final optical signal 14 will be substantially undistorted.

The system optical signal 22 having the third wavelength $\lambda_3$ is then input to a third optical modulator 142, e.g. a Mach-Zehnder interferometer. The third optical modulator 142 modulates the system optical signal 22 in accordance with the corrective amplified electrical signal 130 and outputs the corrective modulated optical signal 62 having the third wavelength $\lambda_3$. The wavelength of the corrective modulated optical signal 62, i.e. $\lambda_3$, can generally be any wavelength other than the wavelength of the first modulated optical signal 40, i.e. $\lambda_1$. That is, the third wavelength $\lambda_3$ can equal $\lambda_2$ or any other desirable wavelength, with the exception that the third wavelength $\lambda_3$ can not be equal to $\lambda_1$.

In one preferred embodiment, the optical detector 118 is capable of handling electrical and optical signals over a wide range of frequencies and amplitudes. Additionally, the third electrical amplifier 126 is capable of handling electrical signals over a wide range of frequencies. Likewise, the third laser diode 138 and the third optical modulator 142 are capable of handling optical signals over a wide range of frequencies and amplitudes. For example, the frequency ranges may include electrical and/or optical signals with frequencies greater that 1 GHz.

The fourth portion 66 of the FFPM circuit 26 includes a second dichroic mirror 146 that combines the first segment 42 of the first modulated optical signal 40 with the corrective modulated optical signal 62. The second dichroic mirror 146 outputs the final modulated optical signal 14. The final modulated optical signal 14 is then input into an output fiber where the final modulated optical signal 14 is transmitted to a receiving device (not shown). The final modulated optical signal 14 comprises the first segment 42 having the first wavelength $\lambda_1$ and the corrective modulated optical signal 62 having the third wavelength $\lambda_3$. The two signals comprising the final modulated optical signal 14, i.e. the first segment 42 and the corrective modulated optical signal 62, are summed when they reach the receiving device. Thus, the final modulated signal 14 received by the receiving device is an undistorted version of the data input electrical signal 18. More specifically, the corrective optical signal 62 corrects any distortion, i.e. non-linearity, in the first modulated optical signal 40 with respect to the data input electrical signal 18.

In one preferred embodiment, the fourth portion 66 additionally includes a delay device 150. The delay device 150 delays the first segment 42 of the first modulated optical signal 40 to compensate for any delay in the corrective modulated optical signal 62 caused by the third electrical amplifier 126. In another preferred embodiment, the delay device 150 and the second dichroic mirror 146 are capable of handing optical signals over a wide range of frequencies and amplitudes. For example, the frequency ranges may include optical signals with frequencies greater that 1 GHz.

It will be appreciated that the all the optical signals generated by the FFMP circuit 26, e.g. optical signals 40, 42, 46, 52, 54, 62 and 14 are optically pumped by the system optical signal 22.

Thus, the fiber optic communications system 10 utilizes the FFPM circuit 26 to modulate the data input electrical input 18 such that the final optical signal 14 received by the receiving device has a substantially linear relationship with the data input electrical signal 18 over a wide range of frequencies and amplitudes.

While the invention has been described in terms of various specific embodiments, those skilled in the art will recognize that the invention can be practiced with modification within the spirit and scope of the claims.

What is claimed is:

1. A fiber optic communication system within a mobile platform, said system comprising:
   a light source adapted to emit a system optical signal;
   an electrical signal source adapted to provide a data input electrical signal; and
   a feed forward photonic modulation circuit adapted to receive the data input electrical signal and the system optical signal and output a final modulated optical signal substantially free from residual error, the feed forward photonic modulation circuit comprising:
   a first portion adapted to receive the data input electrical signal and the system optical signal generate a first modulated optical signal having a first wavelength, and split the first modulated optical signal into a first segment and a second segment; and
   a second portion adapted to receive the data input electrical signal, the system optical signal and the second segment of the first modulated optical signal, generate a second modulated optical signal having a second wavelength, and combine the second segment of the first modulated optical signal with the second modulated optical signal to generate a summed optical signal.

2. The system of claim 1, wherein the feed forward photonic modulation circuit further comprises a third portion adapted to receive the summed optical signal and the system optical signal, and generate a corrective modulated optical signal having a third wavelength.

3. The system of claim 2, wherein the feed forward photonic modulation circuit further comprises a fourth portion adapted to combine the first segment of the first modulated optical signal with the corrective optical signal to generate a final modulated optical signal that has a high degree of linearity with respect to the data input electrical signal.

4. The system of claim 3, wherein the first portion comprises a first electrical amplifier adapted to amplify the data input electrical signal to a first level and output a first amplified electrical signal.

5. The system of claim 4, wherein the first portion further comprises a first optical modulating sub-circuit adapted to use the first amplified electrical signal to modulate the system optical signal and output the first modulated optical signal.

6. The system of claim 5, wherein the first portion further comprises a splitter adapted to split the first modulated optical signal into the first segment and the second segment, wherein each of the first and second segment have the first wavelength.

7. The system of claim 6, wherein the second portion comprises a second electrical amplifier adapted to amplify the data input electrical signal to a second level and output a second amplified electrical signal.

8. The system of claim 7, wherein the second portion further comprises a second optical modulating sub-circuit adapted to use the second amplified electrical signal to modulate the system optical signal and output the second modulated optical signal.

9. The system of claim 8, wherein second portion further comprises a first dichroic mirror adapted to combine the second segment of the first modulated optical signal with the second modulated optical signal and output the summed optical signal.

10. The system of claim 9, wherein the third portion comprises an optical detector adapted to convert the summed optical signal into a corrective electrical signal.

11. The system of claim 10, wherein the third portion further comprise a third electrical amplifier adapted to amplify the corrective electrical signal.

12. The system of claim 11, wherein the third portion further comprises a third optical modulating sub-circuit adapted to use the amplified corrective electrical signal to modulate the system optical signal and output the corrective modulated optical signal.

13. The system of claim 12, wherein the fourth portion comprises a delay device adapted to delay the first segment of the first modulated optical signal.

14. The system of claim 12, wherein the fourth portion comprises a second dichroic mirror adapted to combine the first segment of the first modulated optical signal with the corrective modulated optical signal and output the final modulated optical signal.

15. A method for generating an optical signal having a high degree of linearity with respect to a data input electrical signal used to modulate the optical signal, said method comprising:
   receiving a data input electrical signal and a system optical signal at a first portion of a feed forward photonic modulation circuit and generating a first modulated optical signal having a first wavelength;
   splitting the first modulated optical signal into a first segment and a second segment
   receiving the data input electrical signal, the system optical signal and the second segment of the first modulated optical signal at a second portion of the feed forward photonic modulation circuit and generating a second modulated optical signal having a second wavelength;
   combining the second segment of the first modulated optical signal with the second modulated optical signal to generate a summed optical signal and using the summed optical signal to generate a corrective modulated signal; and
   using the corrective modulated signal to correct for non-linearity in the first segment of the first modulated optical signal, thereby generating a final modulate optical signal having a increased degree of linearity with respect to the data input electrical signal.

16. The method of claim 15, wherein generating the first modulated optical signal having a first wavelength comprises;
   amplifying the data input electrical signal to a first level to produce a first amplified electrical signal; and
   modulating the system optical signal utilizing the first amplified electrical signal to generate the first modulated optical signal.

17. The method of claim 15, wherein generating the second modulated optical signal having a second wavelength comprises:
   amplifying the data input electrical signal to a second level to produce a second amplified electrical signal; and
   modulating the system optical signal utilizing the second amplified electrical signal to generate the second modulated optical signal.

18. The method of claim 15, wherein generating the corrective modulated signal further comprises:

receiving the summed optical signal and the system optical signal at a third portion of the feed forward photonic modulation circuit; and generating the corrective modulated optical signal having a third wavelength.

19. The method of claim 18, wherein generating the corrective modulated optical signal having a third wavelength comprises:

converting the summed optical signal into a corrective electrical signal;

amplifying the corrective electrical signal; and modulating the system optical signal utilizing the corrective electrical signal to generate the corrective modulated optical signal.

20. The method of claim 18, wherein using the corrective modulated signal to correct for non-linearity in the modulated system optical signal comprises combining the first segment of the first modulated optical signal with the corrective optical signal at a fourth portion of the feed forward photonic modulation circuit to thereby generate the final modulated optical signal.

21. The method of claim 20, wherein combining the first segment of the first modulated optical signal with the corrective optical signal comprises delaying the first segment of the first modulated optical signal.

22. A feed forward photonic modulation system for correcting residual error in a modulated optical signal, said system comprising:

a first portion adapted to receive a data input electrical signal and a system optical signal, generate a first modulated optical signal having a first wavelength, and split the first modulated optical signal into a first segment and a second segment;

a second portion adapted to receive the data input electrical signal, the system optical signal and the second segment of the first modulated optical signal, generate a second modulated optical signal having a second wavelength, and combine the second segment of the first modulated optical signal with the second modulated optical signal to generate a summed optical signal;

a third portion adapted to receive the summed optical signal and the system optical signal, and generate a corrective modulated optical signal having a third wavelength; and a fourth portion adapted to combine the first segment of the first modulated optical signal with the corrective modulated optical signal to generate a final modulated optical signal that has a high degree of linearity with respect to the data input electrical signal.

23. The system of claim 22, wherein the first portion comprises a first electrical amplifier adapted to amplify the data input electrical signal to a first level and output a first amplified electrical signal.

24. The system of claim 23, wherein the first portion further comprises a first optical modulating sub-circuit adapted to use the first amplified electrical signal to modulate the system optical signal and output the first modulated optical signal.

25. The system of claim 24, wherein the first portion further comprises a splitter adapted to split the first modulated optical signal into the first segment and the second segment, wherein each of the first and second segments have the first wavelength.

26. The system of claim 25, wherein the second portion comprises a second electrical amplifier adapted to amplify the data input electrical signal to a second level and output a second amplified electrical signal.

27. The system of claim 26, wherein the second portion further comprises a second optical modulating sub-circuit adapted to use the second amplified electrical signal to modulate the system optical signal and output the second modulated optical signal.

28. The system of claim 27, wherein second portion further comprises a first dichroic mirror adapted to combine the second segment of the first modulated optical signal with the second modulated optical signal and output the summed optical signal.

29. The system of claim 28, wherein the third portion comprises an optical detector adapted to convert the summed optical signal into a corrective electrical signal.

30. The system of claim 29, wherein the third portion further comprises a third electrical amplifier adapted to amplify the corrective electrical signal.

31. The system of claim 30, wherein the third portion further comprises a third optical modulating sub-circuit adapted to use the amplified corrective electrical signal to modulate the optical signal and output the corrective modulated optical signal.

32. The system of claim 31, wherein the fourth portion comprises a delay device adapted to delay the first segment of the first optical signal.

33. The system of claim 31, wherein the fourth portion comprises a second dichroic mirror adapted to combine the first segment of the first modulated optical signal with the corrective modulated optical and output the final modulated optical signal.

* * * * *